United States Patent [19]

Carmean

[11] Patent Number: 4,517,654

[45] Date of Patent: May 14, 1985

[54] VIDEO PROCESSING ARCHITECTURE

[75] Inventor: Wesley F. Carmean, Reno, Nev.

[73] Assignee: IGT, Reno, Nev.

[21] Appl. No.: 406,672

[22] Filed: Aug. 9, 1982

[51] Int. Cl.[3] .................. G06F 3/14

[52] U.S. Cl. .................. 364/521; 340/726; 273/85 G

[58] Field of Search .................. 364/410, 521, 518; 273/85 G, DIG. 28; 358/93, 183; 340/726, 721

[56] References Cited

U.S. PATENT DOCUMENTS

| | | | |
|---|---|---|---|
| 3,643,252 | 2/1972 | Roberts, Jr. | 340/726 X |
| 3,742,482 | 6/1973 | Albrecht et al. | 340/726 |
| 3,792,462 | 2/1974 | Casey et al. | 340/726 X |
| 4,053,740 | 10/1977 | Rosenthal | 273/85 G X |
| 4,112,422 | 9/1978 | Mayer et al. | 273/85 G X |
| 4,155,095 | 5/1979 | Kirschner | 273/85 G X |
| 4,165,072 | 8/1979 | Stubben | 273/85 G |
| 4,179,124 | 12/1979 | Margolin | 273/85 G X |
| 4,200,867 | 4/1980 | Hill | 273/85 G X |
| 4,355,805 | 10/1982 | Baer et al. | 273/85 G |

*Primary Examiner*—Edward J. Wise

*Attorney, Agent, or Firm*—Townsend and Townsend

[57] ABSTRACT

An apparatus and method for displaying portions of either a stationary plane image or a movable plane image on a video display. The image formed being composed of image element character blocks, each character block being represented in an addressable character memory. The character block in said movable plane being movable continuously in an upward/downward motion and in a sideways motion in combination and with a move resolution of one pixel or one line.

11 Claims, 8 Drawing Figures

Microfiche Appendix Included
(4 Microfiche, 183 Pages)

VIDEO PROCESSING ARCHITECTURE

A Microfiche Appendix having 3 fiche and 144 frames is included as part of this document.

BACKGROUND OF THE INVENTION

1. Field of the Invention

The present invention relates to a method and apparatus for video processing. More particularly, the present invention relates to a method and apparatus including a stationary plane image for display on a video display and including a movable plane image for display on said video display.

2. Description of the Prior Art

The word "video" conjures up many images. Although at one time the term was limited to television, particularly broadcast television, the term now applies to anything that can form an image on an electronic display, such as a cathode ray tube or plasma panel. Thus, pinball machines are now video games, slot machines are now video gaming devices, and typewriters are now word processors.

A television image is comprised of strings of pixels (picture elements) arranged in lines. Typical U.S. practice has 520 lines containing over 15,000 pixels. To produce a picture for television, a pickup device—e.g., a television camera—assigns a light value to each pixel during each image scan. This information is processed and then reassembled on a display. In this way sharp, realistic images may be formed.

More modernly, images have been formed from computer generated and computer stored graphic blocks. For example, in video games images are formed from graphic building blocks, each building block having certain color and shape characteristics. By assembling the building blocks in particular patterns different objects are represented. The building blocks are easily standardized and stored in a character memory. Numerous images may be formed by arranging the building blocks in different ways according to an instruction set in a processor.

To move a computer generated video image across a display requires shifting the building blocks left or right and up or down. In the prior art, movement of the building blocks involved shifting the images a block at a time. Since each block is usually a square or rectangle consisting of several pixels arranged on horizontal and vertical display axes, movement of the blocks were rather crude approximations of motion. The size of the blocks themselves also gives computer generated graphic images a characteristic jagged or box edged appearance. The jagged edge, coupled with the coarse image movement, created only a sense of movement—it did not lend realism to the image.

Another drawback of most computer graphic systems and computer video systems is that within a library of standard blocks, only a limited number of colors are available. Shading and subtle color shifts are unavailable. Consequently, most graphic displays take on an animated or cartoon character.

One application where prior art video graphics have been less than satisfactory is that of electronic gaming devices. Such devices may simulate a slot machine or other such gaming device. In the slot machine type device, motion of the slot reels should appear as natural as it is in a mechanical slot machine. Additionally, the graphics (cherry, bells, etc.) should be unmistakable and of a quality that game players have come to expect with mechanical devices. Prior art devices provide very coarse approximations of traditional slot machine and other gaming symbols. The motion of the slot reels in play tends to be exaggerated, blurred, and lacking in realism.

In prior art video displays, the graphic images have been coarse approximations of real objects. Rather than show a particular object, the image formed merely suggests in rough outline a particular object. The coarseness of shape, color, and motion in prior art video graphic systems severly handicaps graphic artists and designers in creating exciting and new graphic images for games or for other display purposes.

SUMMARY OF THE INVENTION

The present invention is an apparatus and method for selectably displaying portions of either a stationary plane image or a movable plane image on a video display. The images formed are composed of image element character blocks, each character block being represented in an addressable character memory. The character blocks in the movable plane may be moved continuously in an upward/downward motion and in a sideways motion (two axes of movement) in combination and with a move resolution of one pixel.

The present invention includes a central processor unit for coordinating video processor operation and for assembling an image in response to data received over a central processing unit input data bus. Video processor operating and image forming instructions are stored in a first memory and are addressed by the central processing unit.

The central processing unit provides information in the form of vertical and horizonal timing to a display control circuit. The display control circuit coordinates video processor operation with a video display and thus produces correct vertical and horizonal synchronization signals to operate the display.

Video image forming information is stored in a random access memory (RAM): a first random access memory element storing images for the stationary image plane and a second random access memory element storing image information for the movable image plane.

Image information stored in the random access memory by the central processing unit consists of the addresses of unique character blocks stored in a character generator memory. The arrangement of character blocks determines the graphic display formed. Image information for the stationary and movable planes is shifted from the aforementioned RAM memories in a parallel fashion to a parallel-to-serial converter circuit. Image information is then serially shifted out as strings of digital numbers representing lines of pixels.

A plane select circuit under central processing control selects between the stationary and movable plane at each pixel location and assigns priority to the plane to be displayed at that location. The digital image information is then converted to an analog signal and provided as video to a display.

An important feature of the present invention is the manner in which the movable plane operates. A character block may be moved pixel-by-pixel up or down, or left or right. The invention includes a row subtractor by which a character block may be moved up or down by processor controlled modulo arithmetic. Additionally, a horizonal position circuit is included to shift the character block left or right in discrete, one pixel or more moves. In this way, a character block, and an image formed from groups of character blocks, may be moved in a horizontal and vertical axis singly or simultaneously, a pixel or more at a time. Such arrangement results in image motion having a resolution at a video display resolution limit.

BRIEF DESCRIPTION OF THE DRAWINGS

The present invention is best understood by referring to the specification and the following drawings, in which.

DETAILED DESCRIPTION OF A PREFERRED EMBODIMENT

The present invention is an apparatus and method for simultaneously displaying portions of a stationary plane image and a movable plane image on a video display. The image formed is composed of image element character blocks, each character block being represented in an addressable character memory. A character block is typically an 8-pixel×8-pixel rectangle and is discussed with FIG. 3. The character blocks in the movable plane may be moved continuously in an upward/downward motion, a sideways motion (two axes of movement), or both, in combination and with a move resolution of one pixel (picture element). In this way, more realistic images may be created and presented.

Figure 1:
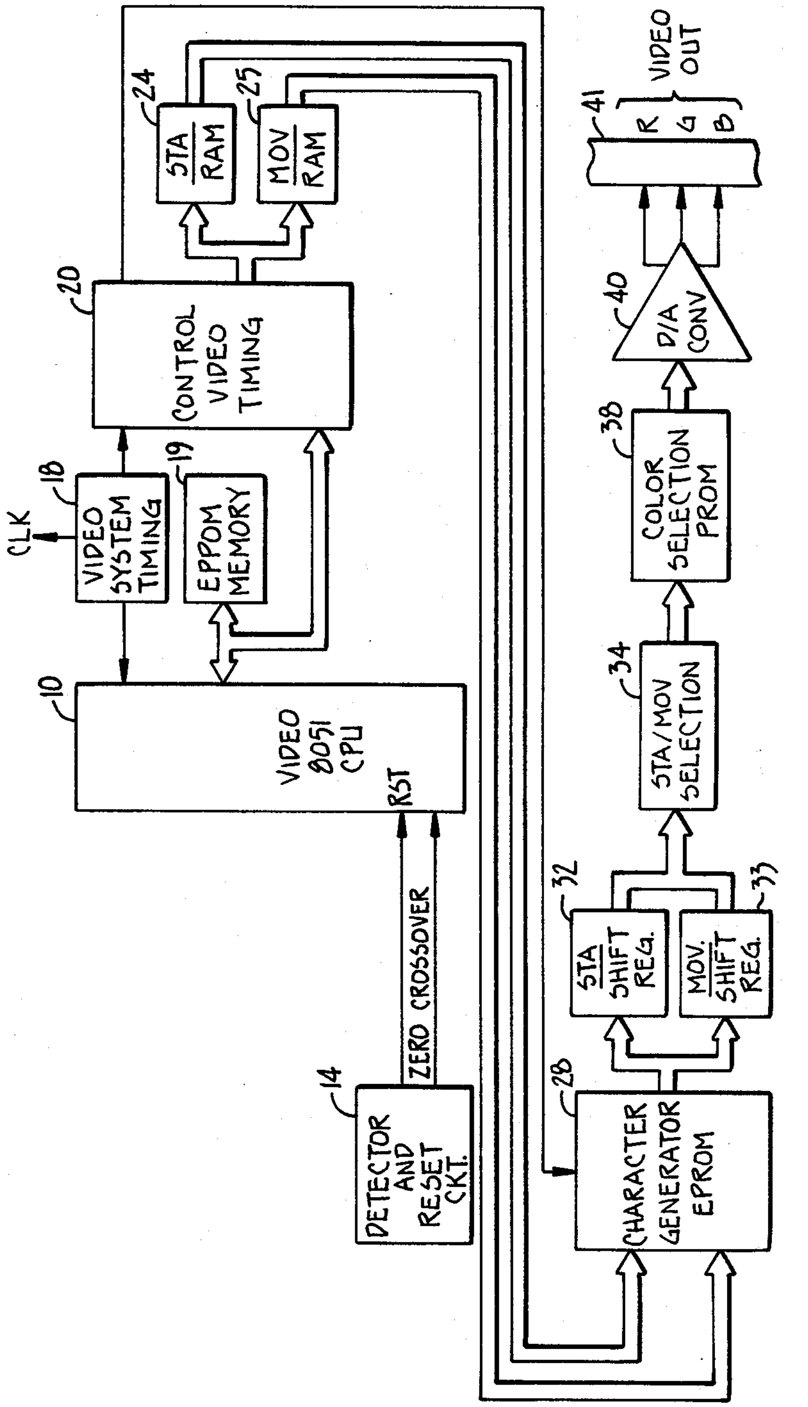
FIG. 1 is a block diagram of the present invention.

The present invention is intended to receive input data over an input bus and generate images in accordance with the data supplied. Typically, the data is supplied by a game circuit. Data in the form of game image movement and game image display are supplied to a video central processing unit (CPU) 10 as shown in FIG. 1. The CPU controls all video operations for its associated game and in accordance with game play control signals received from the game.

Video CPU operation is directed in accordance with a program in an EPROM memory 19. On the occurence of certain game conditions, the CPU addresses the EPROM memory and receives instructions. The EPROM memory 19 program is included as part of the Microfiche Appendix to this document.

The CPU is in communication with a control/video timing circuit 20 by which horizontal and vertical video synchronization is maintained and by which video information is coordinated under CPU control.

In response to game commands and in accordance with instructions in EPROM memory, the video CPU assembles a stationary plane image in a stationary random access memory (RAM) 24. The video CPU also assembles a movable plane image in a movable RAM 25. The images assembled in RAMS 24 and 25 are collections of addresses for data within the character generator EPROM 28. The character generator EPROM 28 has a character program which is included as part of the Microfiche Appendix to this document. Each image location in the RAM contains an address of the character generator EPROM that accesses a unique image building block located in the EPROM at that address. Thus, CPU 10 assembles a stationary and a movable plane image in RAMs 24 and 25 consisting of addresses, each address being the location of a unique portion of the image to be formed.

The data representing the image to be formed are shifted out of the character generator EPROM 28 in parallel. The data corresponding to the stationary plane image are shifted into a stationary shift register 32. The data corresponding to the movable plane image are shifted into a movable shift register 33. On CPU command the data in shift registers 32 and 33 are shifted out in the form of strings of digital words corresponding to the video lines to be formed on the video display. At each display location a priority is assigned to one of the movable and stationary plane images. A selection is made between the stationary plane image and the movable plane image at each video display location by the stationary/movable selection circuit 34. Portions of the viewed image are of the stationary plane and other portions of the video image are of the movable plane. In this way, the movable plane image may move across the image formed by the stationary plane image or the stationary plane image may mask a portion of the movable plane image, depending on the desired image to be displayed.

The information to be displayed on the video display is presented to a color selection PROM 38 and, under CPU control, colors are assigned to the building blocks making up the image on a pixel-by-pixel basis. It is contemplated that each building block may have a plurality of colors assigned thereto.

The digitized video image consisting of portions of the stationary and movable plane and having color data assigned thereto is presented to a digital-to-analog converter 40 wherein the digital information is converted to analog video information. The analog video signal is then output at video out circuit 41 and the cathod ray tube display is thus driven to display the assembled image.

The video CPU and system timing are controlled by a video system timing circuit 18. Additionally, it is contemplated that my invention will find use in various markets. To that end a detector and reset circuit 14 is provided to detect 50- or 60-Hz power operation and to operate the video system accordingly.

Figure 2A:
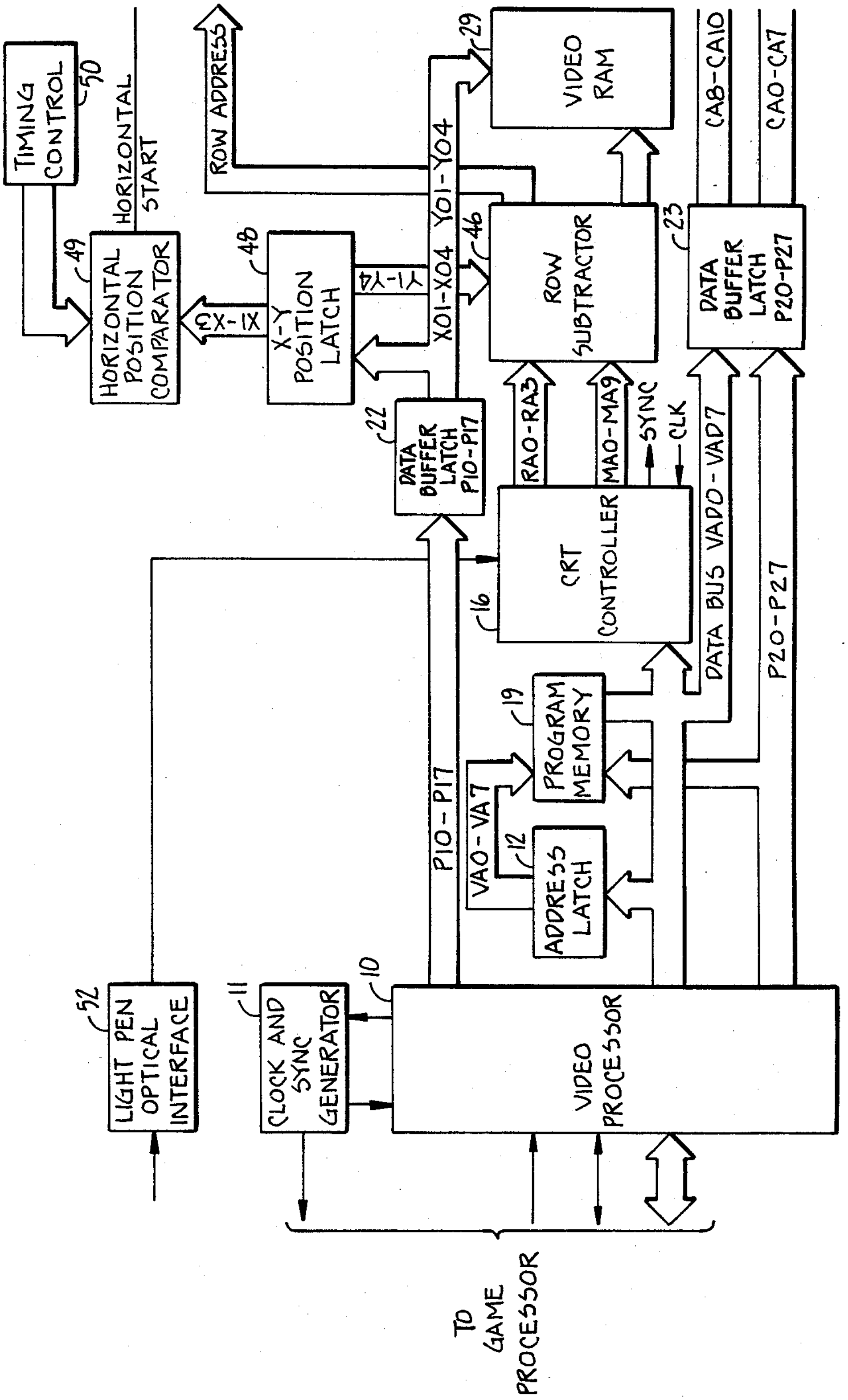
FIG. 2 is a secondary level block diagram of the present invention.
Figure 2:
Figure 2B:
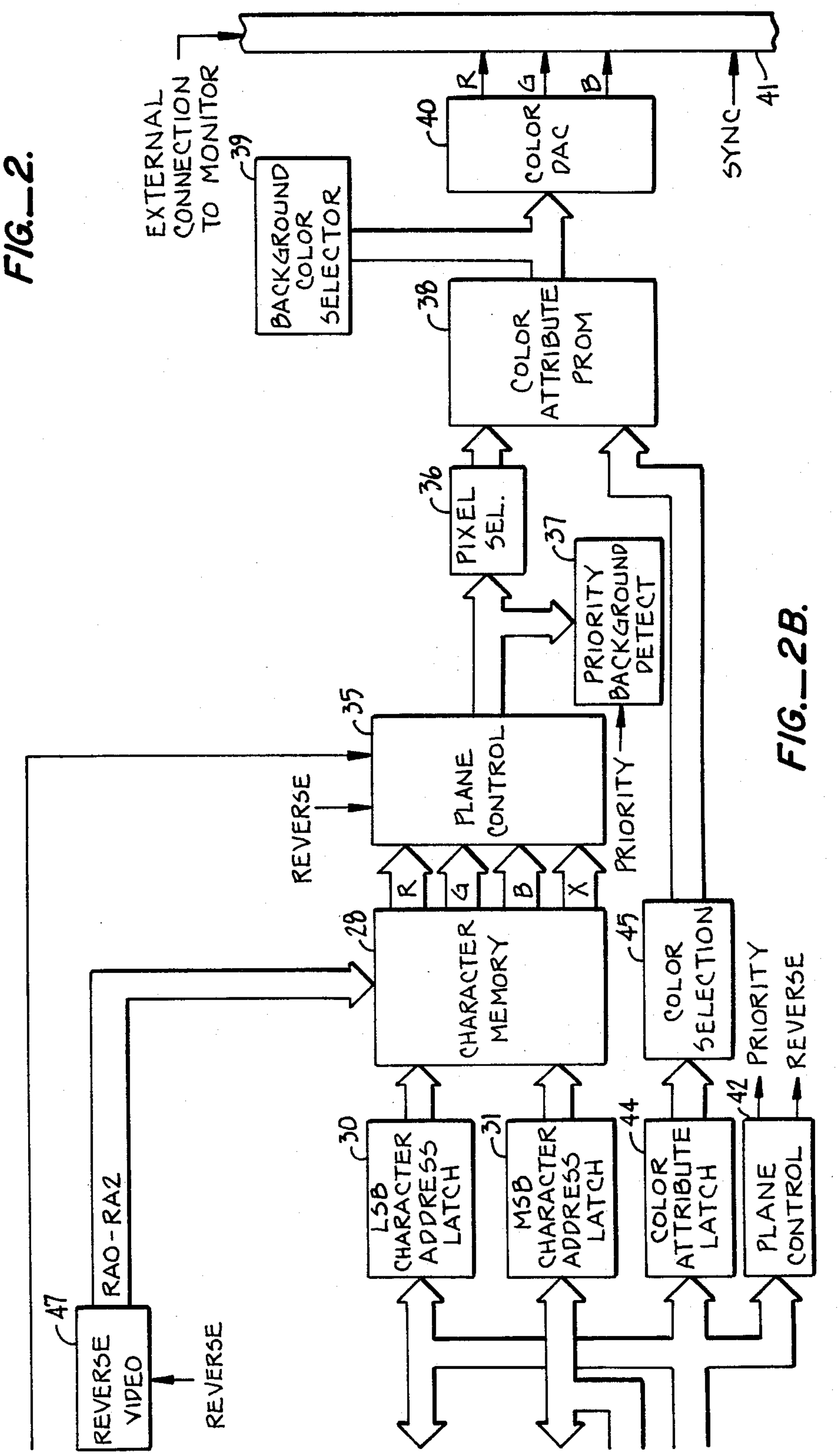
Figure 6:
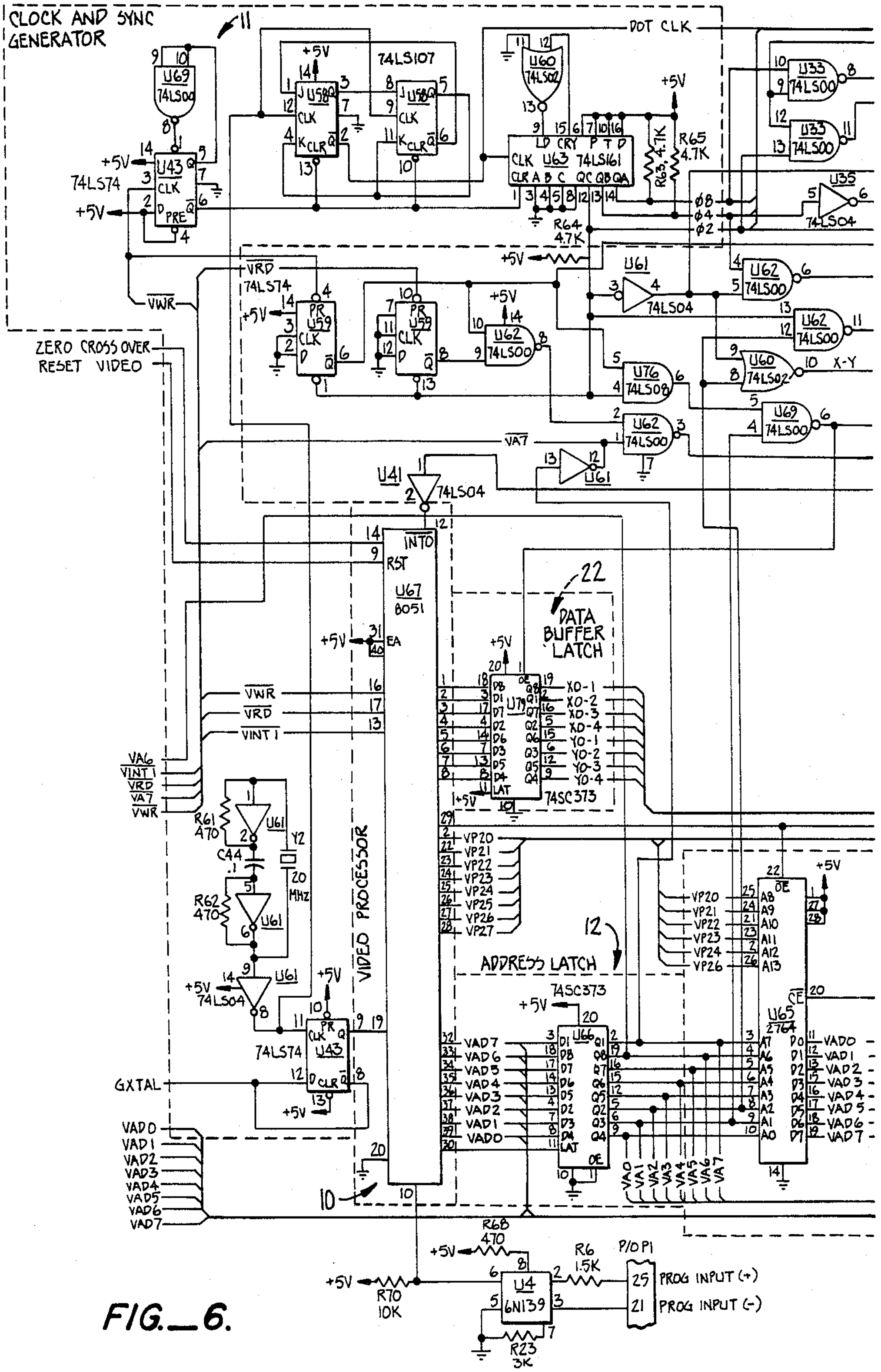
FIG. 6 is a schematic diagram showing the video processor, program memory, clock and sync generator, and associated components.
Figure 6:
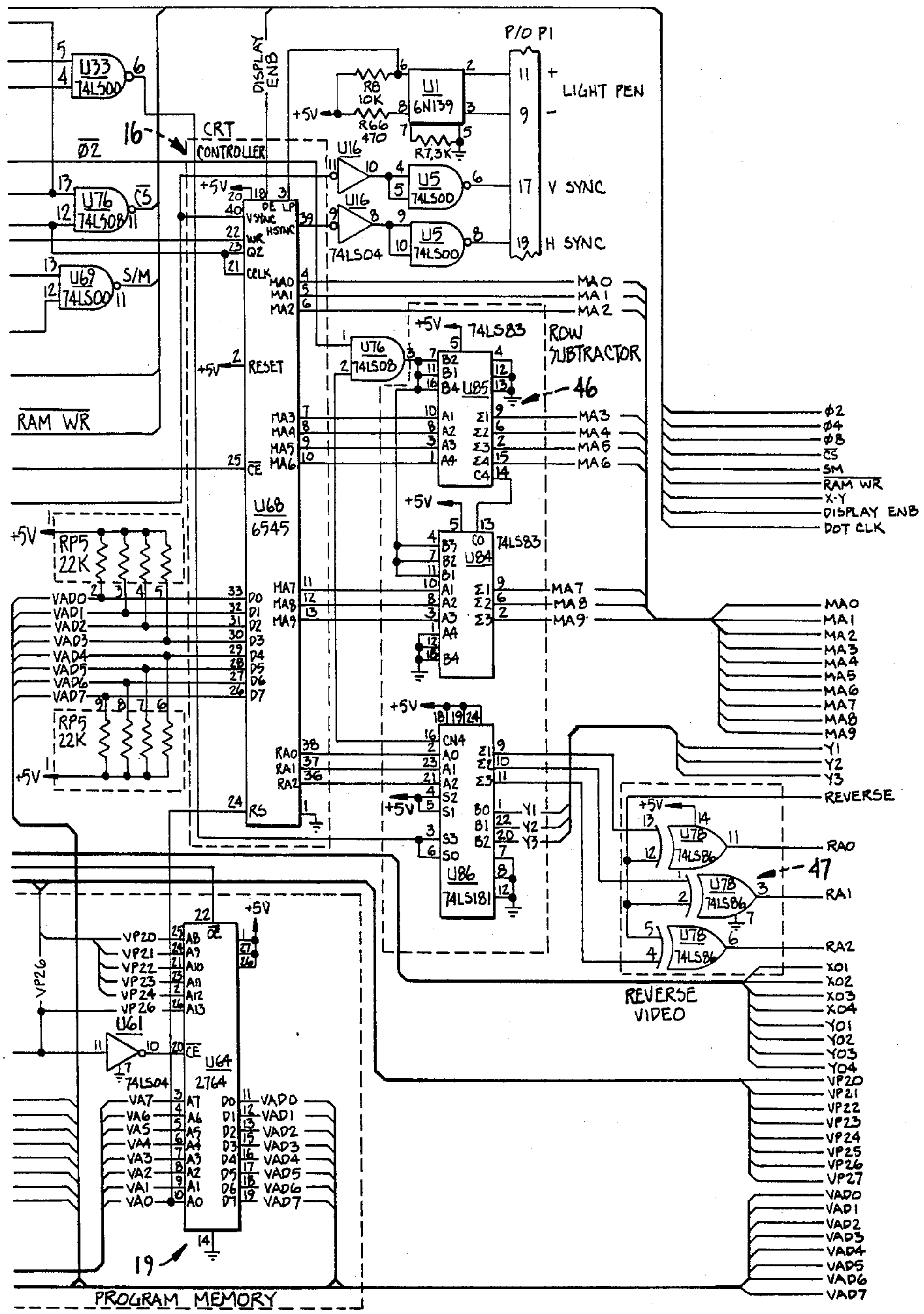

Referring now to FIG. 2 the video processor 10 is shown in more detail. A clock and sync generator circuit 11 operates from a master 20-MHz crystal Y2 (FIG. 6). The clock circuit 11 provides a 10-MHz clock signal to the video processor. The video processor includes a game processor address line by which the video processor is connected to the game processor data bus. Data are received from the game processor (not shown) over the data bus by the video processor 10. Additionally, the video processor may receive an interrupt from the game processor by which the video processor may respond to game processor commands in the middle of a data processing cycle. The video processor provides a data out signal at the game processor data bus to indicate video processor status.

When the video processor receives instructions from the game processor, program memory 19 is addressed via address latch 12. Program memory 19 contains the instructions for operating the video processor and for forming graphic images in accordance with game processor commands. Once addressed, the program memory enables the video processor to generate commands in the form of data supplied to the rest of the video processor circuit.

The CRT controller 16 operates under video processor control and generates vertical and horizontal sync pulses to operate the vertical and horizontal oscillators in the video display (not shown). Provision is made within the CRT controller for a light pen optical interface 52 by which a light pen may be included to provide game user interaction with the game. This feature is optional and may be omitted in other embodiments of the invention. A light pen that may be used with the present invention is described in patent application Ser. No. 400,796, filed Jul. 22, 1982, for a Fibre Optic Light Pen and of which application is a coinventor.

Image forming information is routed through row subtractor 46 (discussed below) to video RAM 29. Additionally, image forming information is routed through data buffer latch 23 to the video RAM as well as to other video processor circuitry.

Video RAM 29 is a 2K random access memory wherein 1K of storage is allocated to a stationary plane image to be formed and the other 1K of storage is allocated to the movable plane image to be formed. The video RAM is shown in FIG. 1 as stationary image RAM 24 and movable image RAM 25. The video RAM may form an image in either plane depending on the receipt of a stationary/movable select signal from the video processor.

Figure 3:
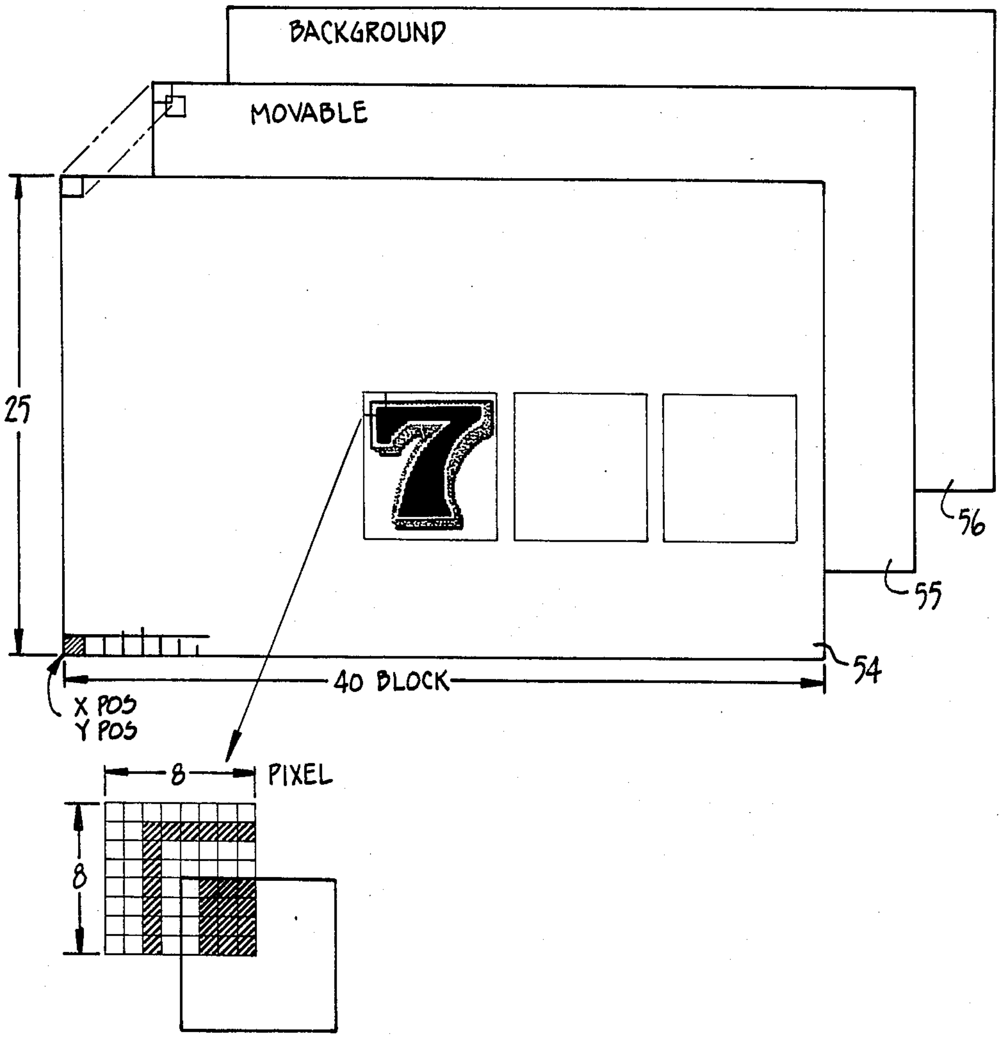
FIG. 3 is a schematic representation of the stationary, movable, and background planes according to the present invention.

When the video processor is to form a stationary plane image, video RAM stationary plane image data is selected by stationary/movable plane selector 34. Image forming information in the program memory is processed and provided to the video RAM in the form of image block locations stored in character memory 28. The 1K of memory in the video RAM is configured as a 40 column by 25 row matrix. The matrix corresponds to block locations in the image plane for the image to be formed (FIG. 3). Thus, each word in the video RAM corresponds to a location in the image to be displayed and contains an address corresponding to a particular character block or image building block to be displayed at that location, the building block being located in character memory 28.

The movable plane is assembled in a similar manner. The images thus assembled in the video RAM are latched at a least significant bit (LSB) character address latch 30 and a most significant bit (MSB) character address latch 31. The latched image addresses character memory 28 which, under video processor control, provides the actual video information necessary to form the image on the video display.

Character memory 28 is like a library of image elements. Each location in the character memory contains information for forming an 8-pixel×8-pixel block (FIG. 3). By connecting the blocks together at different locations in the image plane, different images may be formed. For example, in FIG. 3 the number "7" is shown. The detail in FIG. 3 shows that the number is formed from a series of 8-pixel×8-pixel blocks, each block containing a portion of the image. When the video processor forms an image in accordance with instructions from program memory, it assembles the addresses of each block needed to make the image in the video RAM. Once the image is assembled, the addresses are latched to the character memory and the image is thus formed.

The stationary plane image and the movable plane image are provided to plane control circuit 35. The plane control, among other things, converts the image which it receives in the form of parallel data into a line-by-line digital video signal. Each line output from plane control 35 consists of a plurality of picture elements (pixels) of the image to be formed. Two lines are presented by the plane control to pixel selector circuit 36. One line contains the stationary plane image information for that line in the display; the other line contains the movable plane image information for that line in the display. The pixel selector, under video processor control, selects on a pixel-by-pixel basis which plane is to have priority at that portion in the display. Thus, a final image is formed that is a composite of the stationary plane image and the movable plane image, said composite being formed on a pixel-by-pixel basis.

A unique feature of the present invention is that in the preferred embodiment up to 256 colors may be assigned to an image. The colors are assigned on a block-by-block basis with each block having up to sixteen possible colors. Thus, a color shift from block to block may be very subtle or quite pronounced. Color information is stored in color attribute PROM 38. Color values or attributes are assigned to each pixel under video processor control. Data latched through data buffer latch 23 are provided to color attribute latch 44. The data latched through color attribute latch 34 are decoded at color selection circuit 45 and select a color group for each block from those colors available in color attribute PROM 38.

The assembled image consists of a composite of the stationary plane image and the movable plane image. It comprises character blocks provided on a line-by-line basis wherein each line consists of a plurality of pixels and includes accompanying color information. The assembled image is provided to a color digital-to-analog converter 40. The digital information that comprises the image is converted by digital-to-analog converter 40 to an analog video signal consisting of a red video signal, a green video signal, and a blue video signal. The video information is passed through output circuit 41 and provided to a color video display or monitor (not shown). Horizontal and vertical synchronization information from CRT controller 16 is also provided to the video display at this point.

In one embodiment of my invention a third or background plane is included. The background plane is a user selectable color plane which is used when the stationary and movable plane fail to contain video information. This way the user can select the background color digitally by setting a DIP switch color select circuit 39 to produce a digital signal corresponding to the desired color. Additionally, the background plane may be used in some instances to mask the portion of the display at its periphery that is not addressed by the video processor.

Another feature of my invention is the possibility of reversing the video image. That is, in some embodiments of the invention a display may be installed in a cocktail table or the like where two players may play at opposite ends of the table. In order to present an image visible and understandable at both ends of the table it is necessary to reverse the entire image at some point. A video reverse circuit 47 is provided to accomplish this.

Both the reverse video and the plane priority are controlled by plane control circuit 42. Background priority is detected by background priority detect circuit 37, and a background plane may be supplied as needed. Reverse plane control information is provided to plane control circuit 35. In reverse mode, the plane control circuit reads the parallel data provided by the character memory in an opposite direction from that for normal display mode. Thus, the line of video information presented to the pixel select circuit by the plane control circuit is the reverse of that for normal display.

To reverse video, the row address is presented to the reverse video circuit 47 and the reverse command is provided by main control circuit 42. The rows are assembled in opposite order at the character memory during reverse video and the horizontal lines are shifted out of the plane control circuit 35 in reverse order. In this way a reverse image is formed.

Another unique feature of the invention is the movable plane image motion circuit. The present invention allows an image block to be moved discretely in the horizontal and vertical axes a pixel or line at a time. For example, in a video slot machine the image on a reel may be moved upwardly or downwardly one line at a time to give the impression of reel motion or rotation. Additionally, an image may be moved left or right one pixel at a time. Such capability allows for smooth transition of the image on the video display to create a realistic effect. The video may be shifted in both axes at the same time to produce a diagonal shift at varying angles.

To accomplish a vertical shift a row subtractor circuit 46 is used. The row subtractor circuit may move the movable image up one or more rows by subtracting the desired number of rows. For example, to move the "7" in FIG. 3 up two rows requires subtracting two rows from the movable plane image formed in the video RAM 29. Thus, the image is now formed two rows higher up and motion is suggested.

To move an image down a number of rows involves two's complement subtraction. A substract and comparison is performed in row subtractor 46 by subtractor (ALU) 486 to determine if the current block position should be maintained such that the presently displayed image continues to be displayed or if the image is to move and another block should be displayed. If the image is to move downward, subtractor U86 produces a subtract signal that is provided to subtractors U84/U85. A block subtract is then performed. In the present embodiment of my invention 40 blocks are subtracted. In this way an upper block is selected for display. The 'Y' position (up/down) within that block is provided by row subtractor 46 at lines 'Y1–Y3' and the portion of the image to be displayed by the block is thus positioned within the block.

If the image is to move upwardly, a subtraction is not performed. Rather, the portion of the image to be displayed within the block is positioned within the block a desired number of lines upward.

Horizontal movement of the image in the movable plane is accomplished by horizontal position comparator 49. To select horizontal and vertical positioning, an X-Y position latch 48 is provided. Image movement data may be used to shift the image upward or downward or left or right depending on whether the slide position latch provides data to the row subtractor or to the horizontal position comparator, or both.

Horizontal position movement is accomplished by delaying the start of a particular line in the movable plane. The present horizontal position of the movable image is stored in horizontal position comparator 49. Horizontal position timing is controlled by timing control circuit 50. If the video processor determines that the image is to be shifted to the left two elements, it provides the horizontal position comparator with information to that effect. The horizontal position comparator then looks at the present position of the image in the horizontal axis and compares it with the desired position as established by the video processor. When the desired position is approached, the horizontal position comparator sends a horizontal start command to the plane control circuit which then starts shifting the line out of its registers.

To shift the horizontal image to the right involves the same procedure as above, only the image is now shifted out sooner during the current sequence than it was on the previous sequence. This is accomplished by the timing counter circuit 50 operating at a faster rate.

If a block move is more than 8 pixels (either horizontal or vertical), a new image must be constructed as data in the movable RAM. As long as block moves are less than 8 pixels from an original movable RAM data generated image, the data in the movable RAM are not changed. This arrangement eliminates the need to constantly "refresh" the movable RAM. Thus, the processor has less "overhead" to manipulate.

Figure 4:
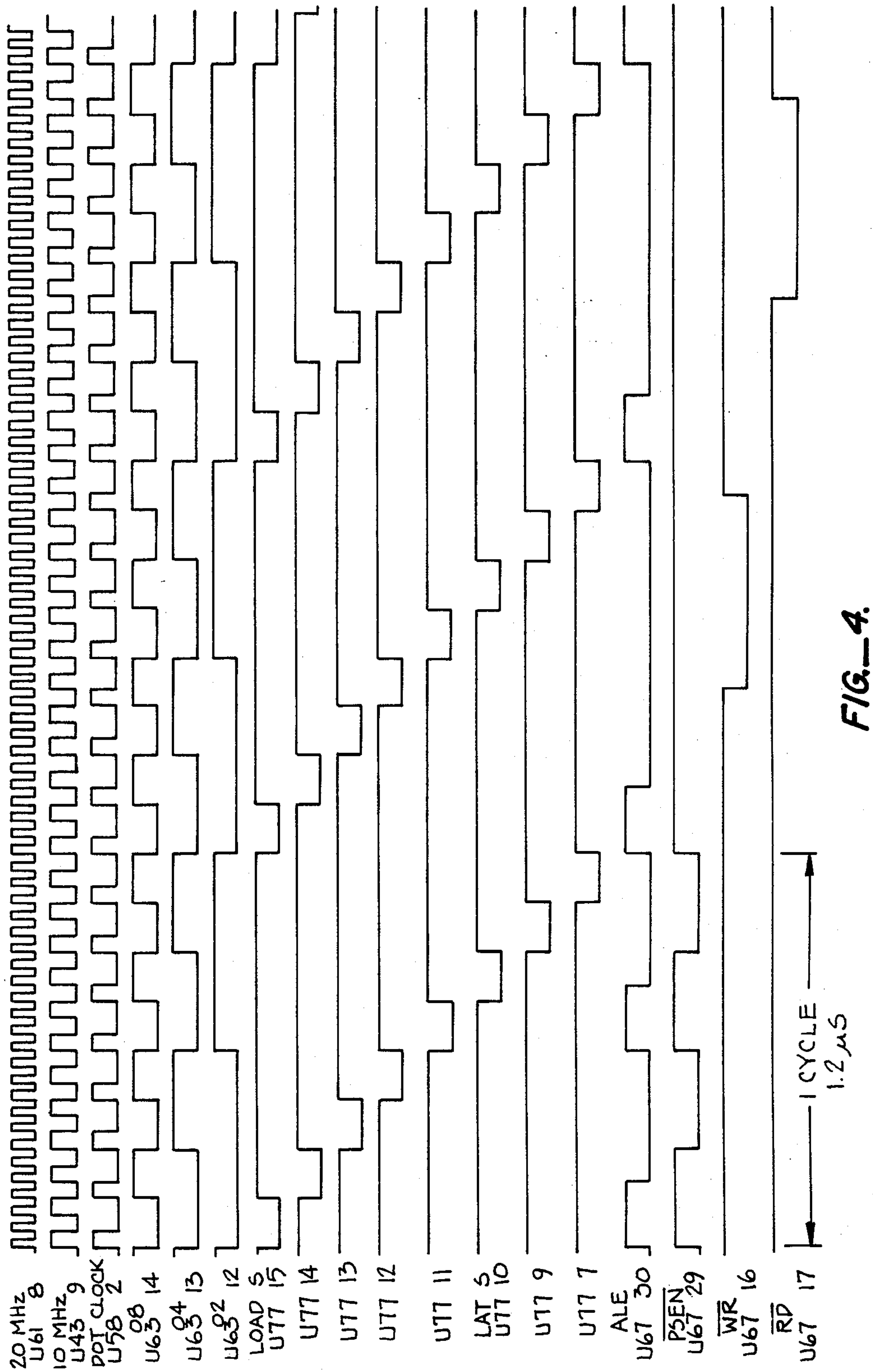
FIG. 4 is a timing diagram showing a program memory read, a data memory write, and a data memory read.

FIG. 4 is a timing diagram showing program memory read, data memory write, and data memory read cycles. At the top of the figure is a 20-MHz clock pulse as presented to the video processor by the clock and sync generator. The clock pulse is presented at U61-8 (FIG. 6) as produced by 20-MHz crystal Y2. The 20-MHz clock signal is provided to counter U43 where it is divided by two to produce a 10-MHz video processor clock signal. A dot clock signal is also produced at U58-2 to operate CRT controller 16. Additional timing signals are produced by counter U63 - Ø8 at U63-14, Ø4 at U63-13, and Ø2 at U63-12.

Timing control circuit 50 comprising counter U77 provides a "load S" control for loading data into the plane control. Additionally, the timing control supplies a "latch S" control for latching the plane control, once data is loaded therein. Various other signals are provided by the timing control to operate character address latches 30 and 31.

At the beginning of the program memory read cycle, video processor 10 provides an address latch enable (ALE) signal to address latch 12 (U66). The signal enables the address latch to latch address data from the video processor through to the program memory 19. At the same time the $\overline{\text{PSEN}}$ signal is sent to the program memory (U64/U65) to enable the memory to be read according to address information provided by the address latch 12.

After the program memory has been read, a data memory write cycle is begun during which a write enable (WR) is provided to the video RAM 29. The video processor writes image forming information into the video RAM circuit during the data memory write cycle.

During the data memory write cycle an image is formed in accordance with program information obtained during the program memory read cycle and written into the RAM at that time. During the data memory read cycle the formed image is latched out of the video RAM.

Figure 5:
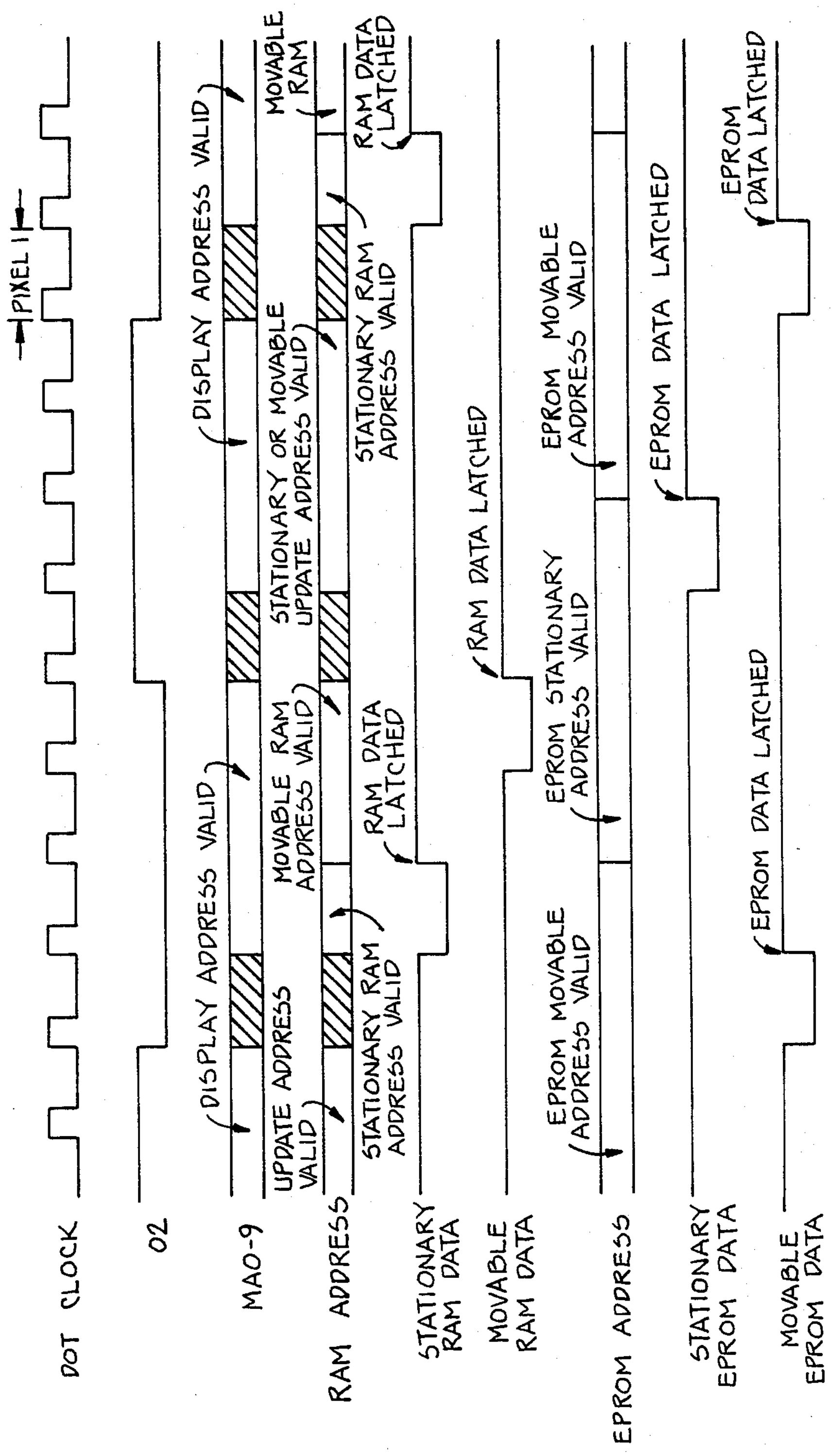
FIG. 5 is a timing diagram showing one cycle of video processor operation.

FIG. 5 shows an entire circuit operation cycle which includes a series of the video processor cycles (shown in FIG. 4). The "dot clock" signal operates at a pixel rate and is used to clock data out of the plane control circuit. The Ø2 signal is used to enable the video RAM for a read or write operation. It can be seen in FIG. 5 that when the Ø2 signal goes low the video RAM is enabled. A display address is presented to the video RAM from CRT controller 16 via address lines MA0–MA9. The Ø2 clock signal is followed by a 'display address valid' window at which time data is present on the data bus.

During the 'display address valid' window the 'stationary RAM address valid' window is present. At that time stationary RAM data is latched into the stationary RAM portion of the video RAM. Following the stationary RAM data signal, a 'movable RAM address valid' window is created and, shortly thereafter, movable RAM data are latched into the movable RAM data portion of the video RAM.

Once the stationary RAM data are latched, a window is created for EPROM character memory 28 by which the stationary address data is directed to the EPROM character memory. During this window, the stationary EPROM address data are latched into the stationary portion of the EPROM character memory.

After the EPROM 'stationary address valid' window is closed, an EPROM 'movable address valid' window is opened by which the movable plane portion of the EPROM character memory may be addressed by data latched into the movable RAM portion of the video RAM. An EPROM data latch signal occurs during this window that latches the movable EPROM data.

While the display address information is being processed, an 'update address valid' window is opened on the data bus (MA0–MA9). During this window stationary or movable data may be presented to the video RAM over the data bus to be latched in during the next cycle.

Figure 7:
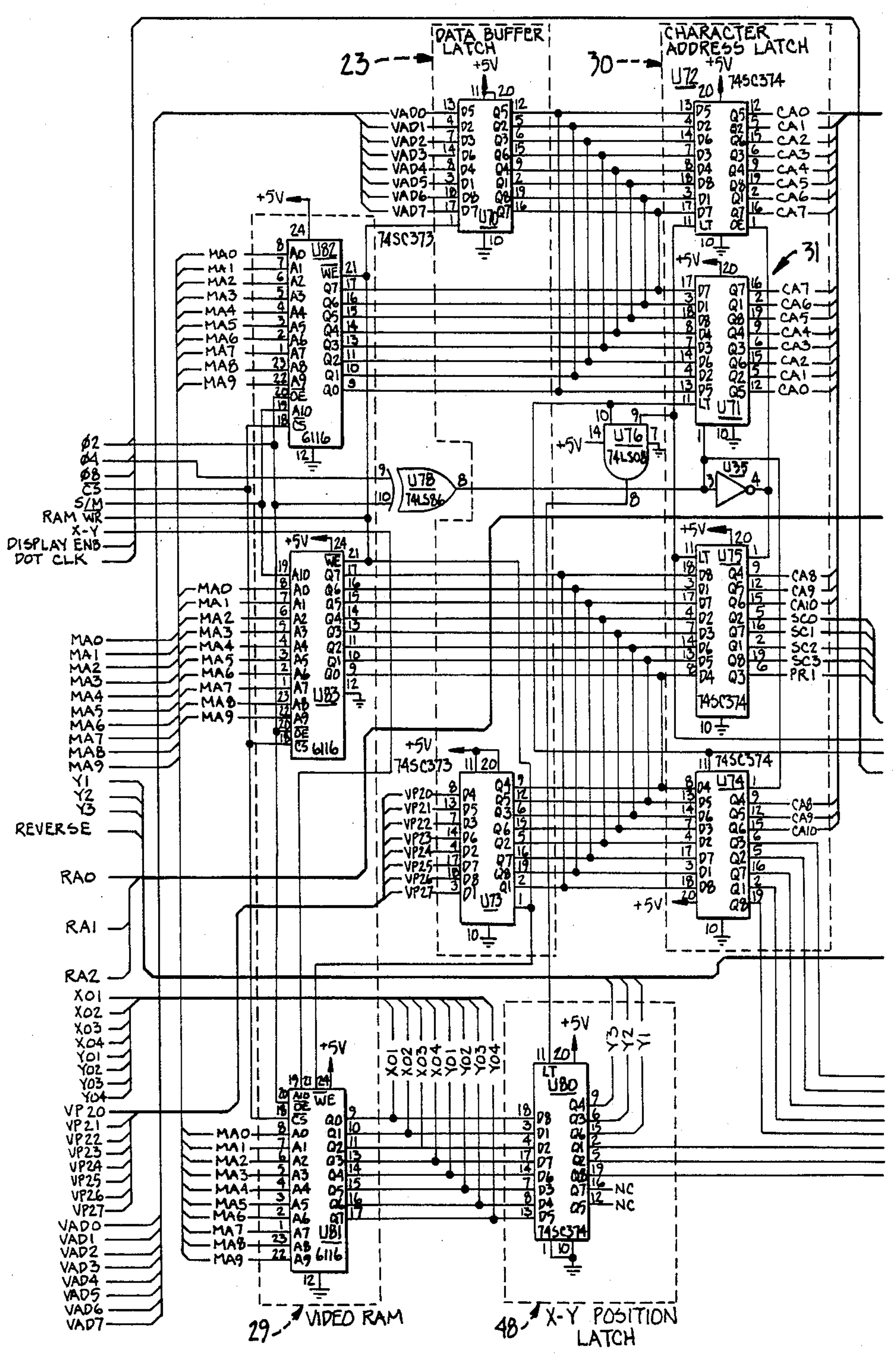
FIG. 7 is a schematic diagram showing the video RAM, plane control, timing control, character memory, data buffer latches, and associated circuitry.
Figure 7:
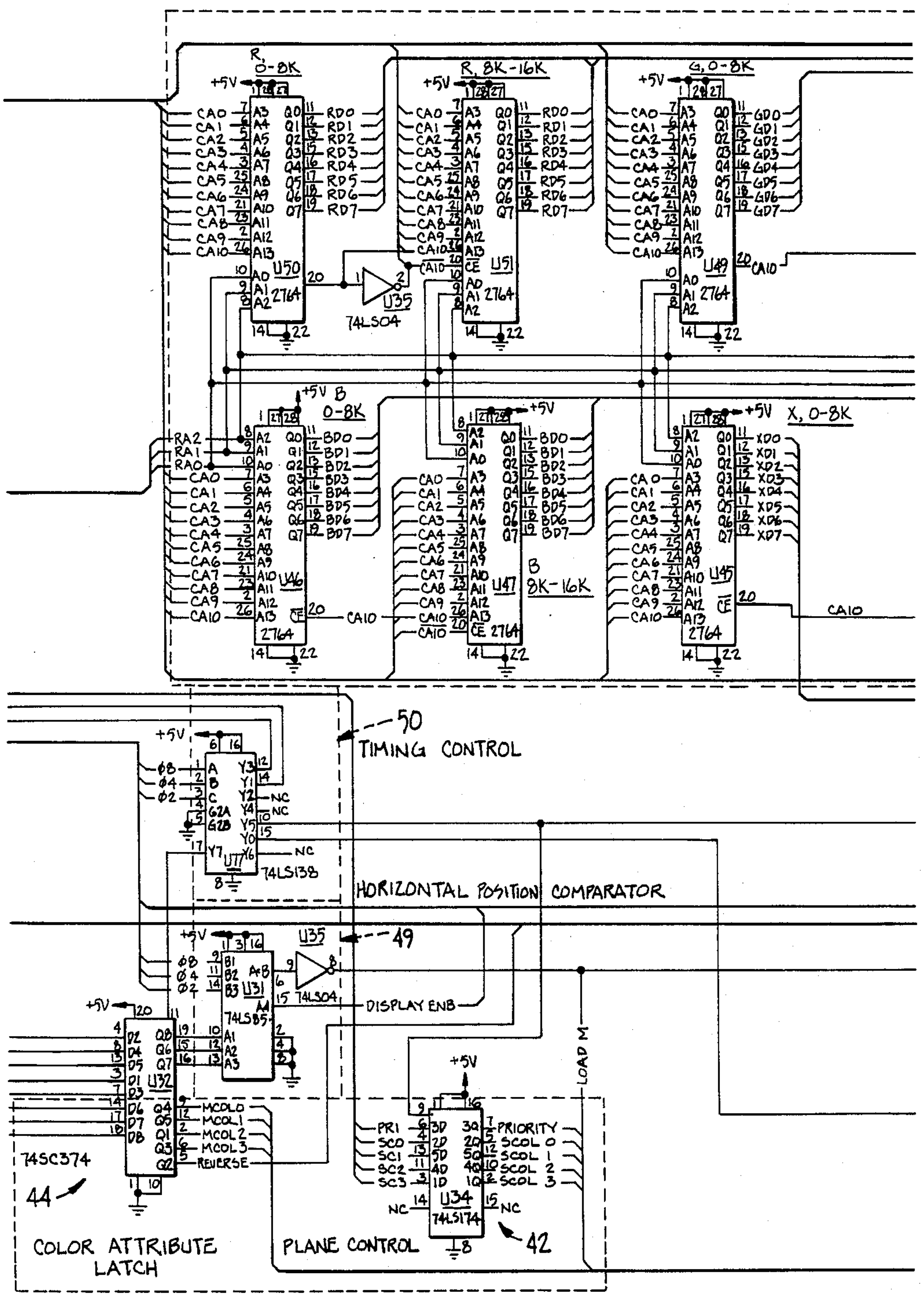
Figure 7:
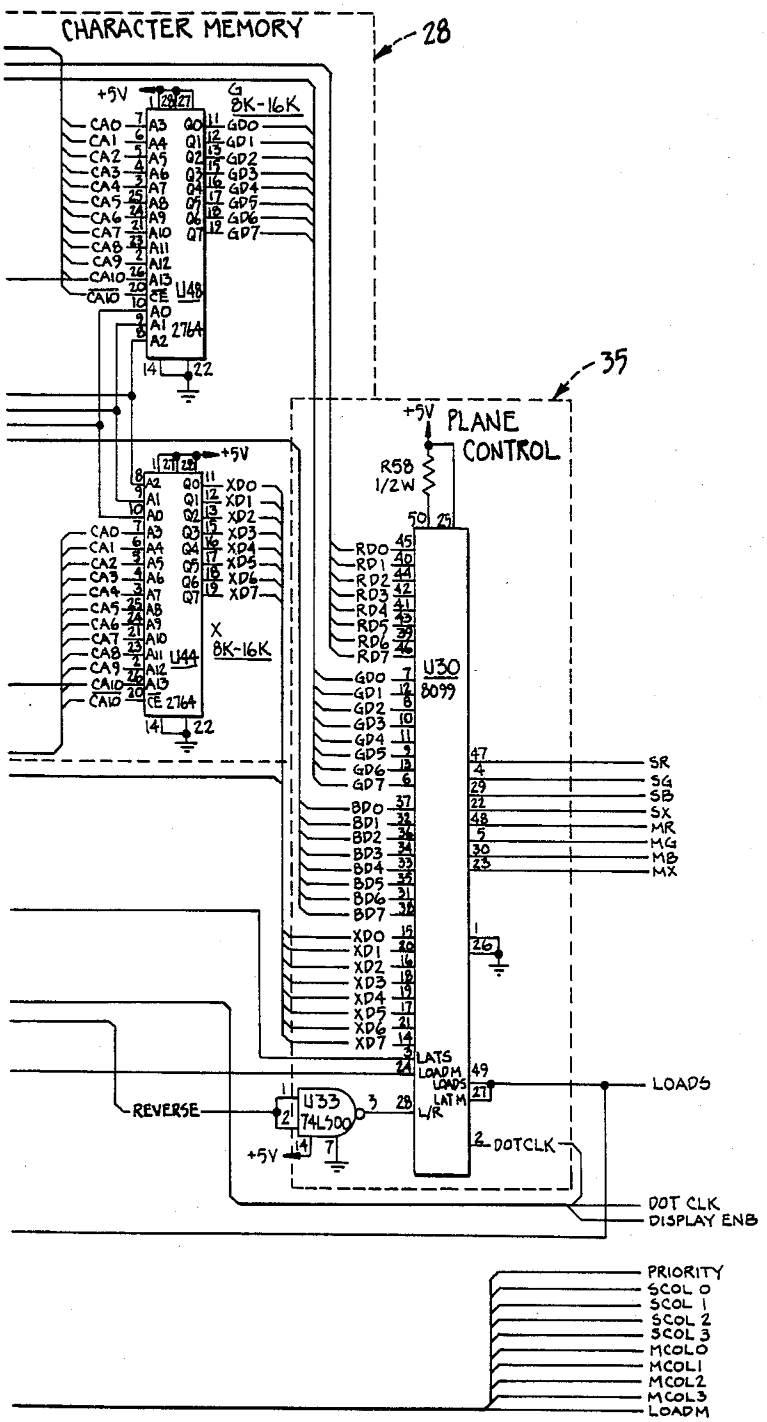
Figure 8:
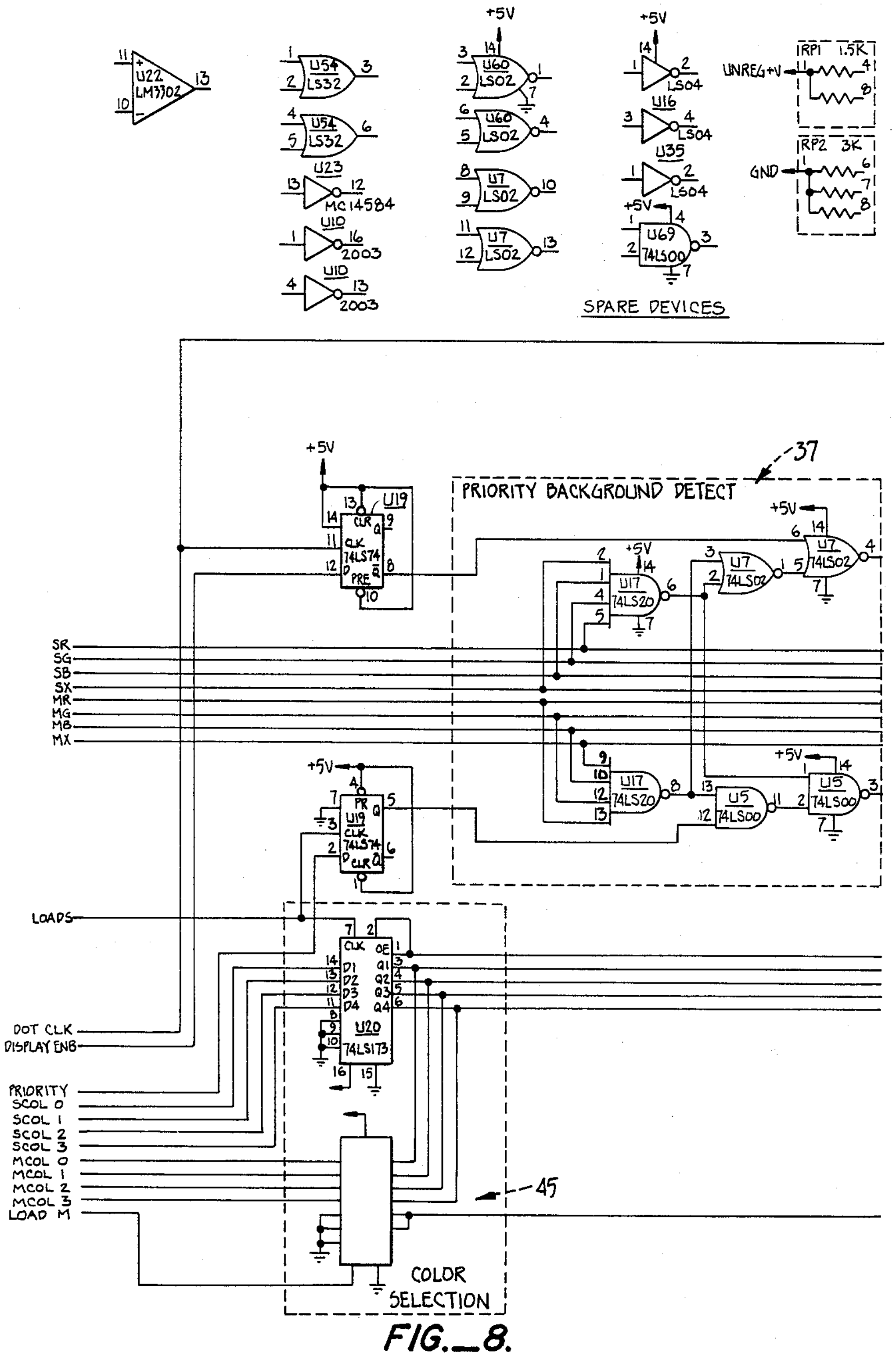
FIG. 8 is a schematic diagram showing the priority background detect, background color selection, color digital/analog converter, color attribute PROM, and associated circuitry.
Figure 8:
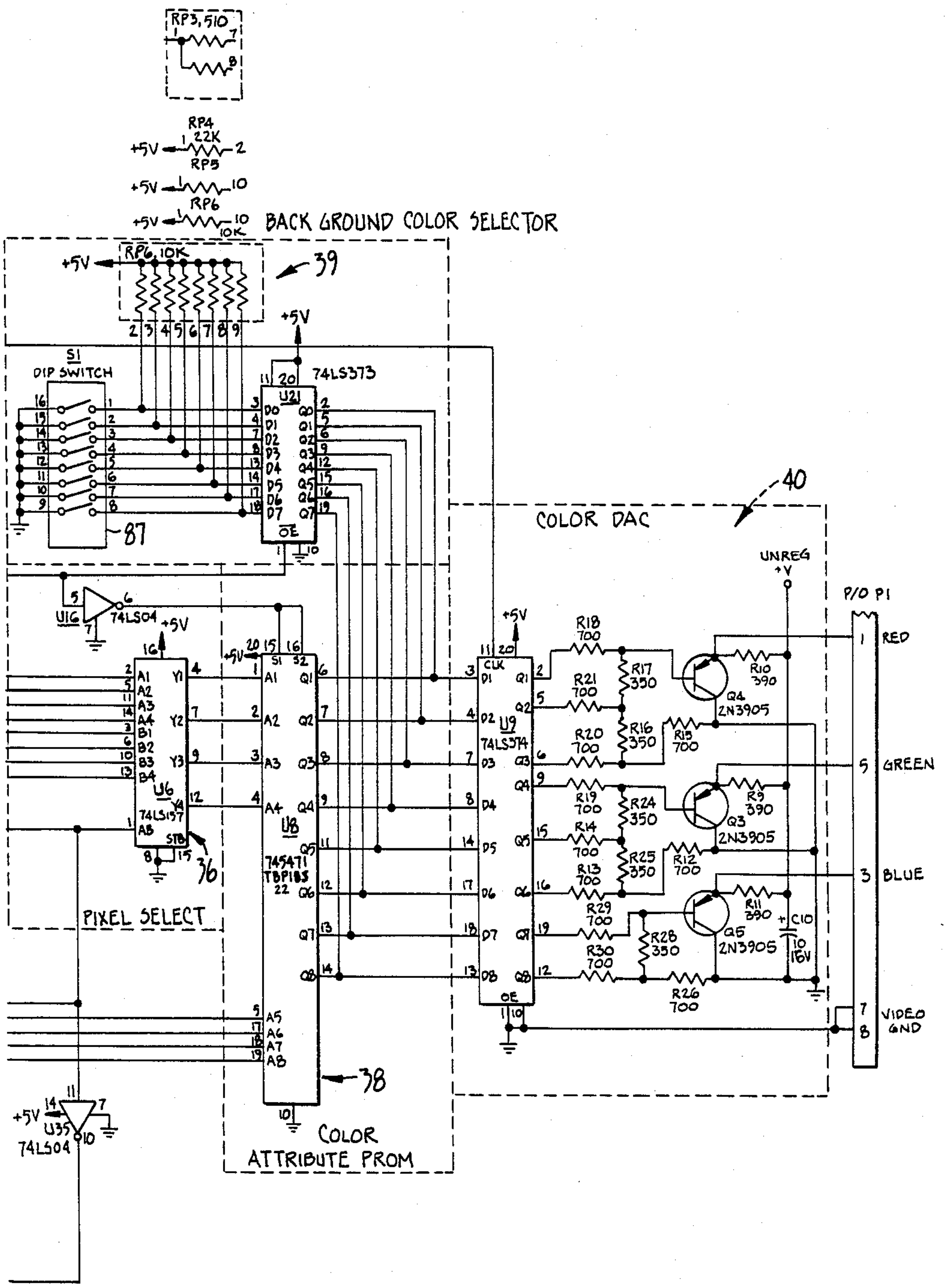

The hardware for achieving the foregoing is shown in more detail in the schematic diagrams of FIGS. 6–8. It should be noted that in FIG. 8 the background color selector 39 is shown to include an 8-element DIP switch by which one of 256 possible background colors may be selected depending on the switch position set.

The foregoing was given by way of example and illustration. The scope of the present invention should be limited only by the breadth of the following claims.

I claim:

1. An apparatus for selectably displaying a stationary plane image and a movable plane image on a video display, comprising:

first means for storing image forming instructions at addressable storage locations and for supplying said image forming instructions from each addressable storage location;

a processor coupled to said first means for assembling said stationary plane image and assembling said movable plane image during a display interval, in accordance with said image forming instructions, and in response to image forming data input to said processor via a processor data bus;

a video controller coupled to said processor for generating a vertical display synchronization signal output and a horizontal display synchronization signal output;

a character generator including a plurality of addressable character blocks from which a display image output may be formed;

second means having an input coupled to said processor for storing said assembled stationary plane image and said assembled movable plane image, said second means having an output coupled to said character generator for selecting character blocks within said character generator for display according to said assembled stationary plane image and said assembled movable plane image;

a row subtractor coupled to said processor for discretely shifting said movable plane image in a vertical display axis once during each display interval;

a horizontal counter coupled to said processor for discretely shifting said movable plane image in a horizonal display axis once during each display interval; and means coupled to said character generator for selecting, according to a processor assigned priority and on a picture element basis, between display of said stationary plane image and display of said movable plane image and for forming a composite image to be displayed.

2. The apparatus of claim 1, further comprising means coupled to said image selecting means for assigning, on a character block basis and under processor control, color attributes to said composite image to be displayed.

3. The apparatus of claim 2, further comprising means coupled to said color assigning means for generating a background plane image associated with said composite image to be displayed.

4. The apparatus of claim 3, further comprising means coupled to said row subtractor and said horizontal counter for reversing said composite image to be displayed.

5. An apparatus for forming a composite video image including a stationary plane image component and a movable plane image component on a video display and in response to externally generated image forming commands, comprising:

a first memory for storing image forming instructions at addressable memory locations, said image forming instructions producing a memory output when an associated memory location is addressed;

a central processing unit coupled to said first memory, said processor assembling said stationary plane image component and said movable plane component during a composite video image display interval and in accordance with said image forming instructions from said first memory, said processor being responsive to image forming commands provided at a processor data input bus;

a video controller coupled to said central processing unit for generating a vertical display synchronization signal and for generating a horizontal display synchronization signal;

a stationary plane random access memory for assembling character addresses corresponding to said stationary plane image component in response to data and commands supplied by said processor;

a movable plane random access memory for assembling character addresses corresponding to said movable plane image component in response to data and commands supplied by said processor;

a character generator including a plurality of addressable character blocks from which a display image output may be formed in response to character addresses stored in said stationary and movable random access memories;

a row subtractor coupled to said processor for discretely shifting said movable plane image component position in a vertical display axis once during each display interval;

a horizontal counter coupled to said processor for discretely shifting said movable plane image component position in a horizontal display axis once during each display interval;

means for converting assembled character block image information corresponding to said stationary plane component and corresponding to said movable plane component intp digital video line information;

means for selecting, according to a processor assigned priority and on a picture element basis, between display of said stationary plane image component and said movable plane image component and for forming a composite video image to be displayed; and a digital-to-analog converter for converting said digital line information to analog video information corresponding to said composite video image.

6. The apparatus of claim 5, further comprising:

a color memory for storing a plurality of image colors, said image colors being assignable under processor control on a character block basis; and means coupled to said processor for selecting colors to be displayed on a character block basis.

7. The apparatus of claim 6, further comprising:

means for generating a background plane image component of the composite video image to be displayed; and a background color select switch for assigning one of a plurality of background colors to said background plane.

8. The apparatus of claim 5, further comprising:

means for reversing said composite video image to be displayed including:

(a) a reverse video latch coupled to said row subtractor for reversing the order of display of said video lines; and (b) a reverse plane control for reversing in mirror image fashion each video line.

9. A method for forming a composite video image during a display interval from a stationary plane image component and from a movable plane image component in response to externally generated image forming commands, comprising the steps of:

retrieving, by means of a processor, image forming instructions stored at addressable storage locations in an image forming instruction memory, the image forming instructions being retrieved in response to said image forming commands;

assembling a stationary plane image consisting of a plurality of character block addresses in a stationary plane image memory in accordance with said retrieved image forming instructions;

assembling a movable plane image consisting of a plurality of character block addresses in a movable plane image memory in accordance with said retrieved image forming instructions;

generating a vertical display synchronization signal and a horizontal display synchronization signal;

forming a stationary plane image component from a plurality of character blocks stored in a character generator and in accordance with said character block addresses assembled in said stationary plane image memory;

forming a movable plane image component from a plurality of character blocks stored in a character generator and in accordance with said character block addresses stored in said movable plane image memory;

discretely shifting said movable plane component in a vertical display axis once during each display interval by means of a row subtractor coupled to said processor;

discretely shifting said movable plane component in a horizontal display axis once during each display interval by means of a horizontal counter coupled to said processor; and selecting, according to a processor assigned priority and on a picture element basis, between display of said stationary plane image component and said movable plane image component to form a composite video image to be displayed.

10. The method of claim 9, further comprising the steps of;

selecting a color to accompany each character block from a plurality of colors stored in a color selection memory.

11. The method of claim 10, further comprising the steps of generating a background plane image component of said composite video image.

* * * * *